C. BACKMAN.
BREAD CUTTER.
APPLICATION FILED MAR. 14, 1912.
1,038,820.
Patented Sept. 17, 1912.
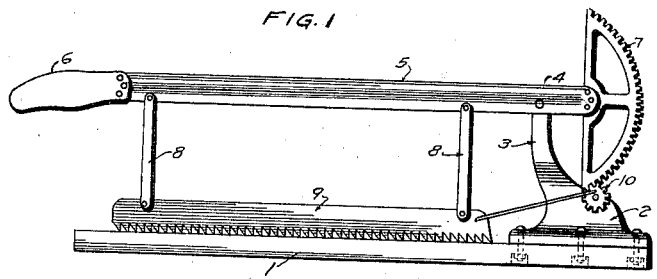
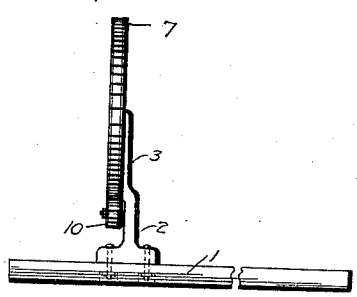
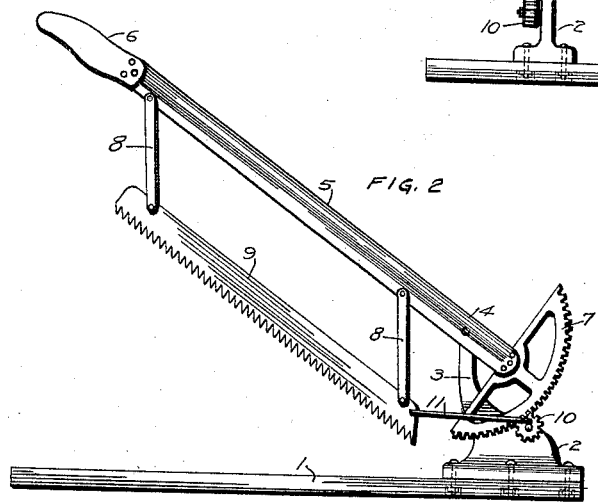
WITNESSES
INVENTOR
Carl Backman
BY
H. Danders
ATTY.

UNITED STATES PATENT OFFICE.

CARL BACKMAN, OF JAMESTOWN, NEW YORK.

BREAD-CUTTER.

1,038,820.  Specification of Letters Patent.  Patented Sept. 17, 1912.

Application filed March 14, 1912. Serial No. 683,850.

*To all whom it may concern:*

Be it known that I, CARL BACKMAN, a citizen of Sweden, residing at Jamestown, in the county of Chautauqua, in the State of New York, have invented certain new and useful Improvements in Bread-Cutters, of which the following is a specification.

This invention relates to improvements in bread cutters and its object is to produce a device of this class that is simple in construction and easy of operation. A slice may be cut from several loaves of bread at one operation.

With the foregoing and other objects in view the invention consists in the combination and arrangement of parts to be hereinafter fully described in the following specification, pointed out in the claim and illustrated in the accompanying drawing which forms a part of the specification and in which—

Figure 1 is a side elevation of my improved bread cutter. Fig. 2 is a similar view with the cutting mechanism at another position. Fig. 3 is a front elevation. Fig. 4 is a vertical section.

Like reference characters indicate corresponding parts throughout the several views.

1 is the base of the device upon which the bread to be cut is placed and to which is secured a support 2 formed with an integral arm 3. To the arm 3 is pivotally secured as at 4 a longitudinal shaft 5 provided at one extremity with a handle 6 and at the opposite with a serrated segment 7. A pair of depending arms 8—8 pivotally secured to the shaft 5 carry a blade 9 which performs the slicing operation. 10 is a pinion mounted upon the support 2 in mesh with the segment 7 and having secured to its face one extremity of a link 11 the other end of which engages the blade 9.

Operation: The loaf or loaves of bread to be cut are placed side by side upon the base 1 beneath the blade 9 when the same is in the raised position shown in Fig. 2. When the shaft 5 is lowered the segment 7 rotates the pinion 10 which oscillates the blade 9 as it descends causing it to slice or cleave the bread or like substance with which it comes in contact.

What is claimed is:—

In a bread cutter, the combination with a base and a support formed with an integral arm secured upon said base, of a longitudinal shaft pivotally secured to said arm, a toothed segment terminally carried by said shaft, a blade suspended from said longitudinal shaft and movable independently thereof, a pinion carried by the aforesaid support in mesh with the aforesaid segment and a link connecting the said pinion with the said blade.

In testimony that I claim the foregoing as my own I have hereto affixed my signature in the presence of two subscribing witnesses.

CARL BACKMAN.

Witnesses:
 JOHAN SWANSON,
 ALFRED MALMBERG.

Copies of this patent may be obtained for five cents each, by addressing the "Commissioner of Patents, Washington, D. C."